United States Patent [19]

Bell, Jr. et al.

[11] 4,267,423
[45] May 12, 1981

[54] PROTECTION CIRCUIT FOR ELECTRICAL DISCHARGE MACHINING POWER SUPPLY

[75] Inventors: Oliver A. Bell, Jr., Statesville; Randall C. Gilleland, Troutman; Davey J. Chance, Concord, all of N.C.

[73] Assignee: Colt Industries Operating Corp, New York, N.Y.

[21] Appl. No.: 41,766

[22] Filed: May 24, 1979

[51] Int. Cl.³ .............................................. B23P 1/02
[52] U.S. Cl. ................................ 219/69 S; 219/69 C
[58] Field of Search ................... 219/69 S, 69 C, 69 P

[56] References Cited

U.S. PATENT DOCUMENTS

| 3,778,579 | 12/1973 | Takarada ........................... 219/69 S |
| 3,805,012 | 4/1974 | Bell, Jr. et al. ..................... 219/69 S |
| 3,816,692 | 6/1974 | Ratmansky ......................... 219/69 S |
| 3,825,713 | 7/1974 | Bell, Jr. ............................. 219/69 S |

*Primary Examiner*—C. C. Shaw
*Attorney, Agent, or Firm*—Harry R. Dumont

[57] ABSTRACT

Gap current is sensed and a voltage signal representative of gap current is integrated to provide a relatively stable DC voltage that is proportional to average current at the gap. A reference setting is made to which the average gap current is compared and, responsive to rise in current above that level, cutoff of the power supply will be initiated.

6 Claims, 2 Drawing Figures

PROTECTION CIRCUIT FOR ELECTRICAL DISCHARGE MACHINING POWER SUPPLY

BACKGROUND OF THE INVENTION

A number of protection systems are known in the electrical discharging machining art in which electrical parameters of gap conditions are responded to when these are of an abnormal level to provide interruption of the power supply particularly in response to gap short circuit condition. The present invention is related to an embodiment of an EDM power supply in which the output switches are transistors, although it is equally applicable to any precision type EDM power supply in which electronic switches are used to provide machining power pulses to the machining gap. By "electronic switch" we mean any electronic control device having a plurality of electrodes including at least two principal or power conducting electrodes acting to control current from the power circuit, the conductivity of the power circuit being controlled by a control electrode within the switch so that the conductivity of the power circuit is statically or electrically without the movement of any mechanical elements within the switch. Included within the definition, by way of illustration and not limitation, are electronic tubes, transistors, semi-conductor control rectifiers, and the like.

The protection system of the present invention is specially adapted for use in small hole electrode EDM in which one or more wire-type electrodes are used to provide small slotted or channel openings in a workpiece. When the electrodes are very small, it is generally necessary to limit the current flow to four or five amperes. When this level is exceeded, the electrodes become heated and actually become white-hot. At this point, the usual cutoff circuitry used is unable to respond due to the fact that the reason voltage increased across the small electrode because it got hot and the resistance increased. The normal cutoff system which responds to sudden drop in gap voltage will not operate here but will continue to allow full current flow to the electrodes which will, in many cases, be burned up.

The essential problem is to provide a current limiting system for this type of EDM operation.

There are available a number of cutoff systems which interrupt the operation of a power supply responsive to an appropriately sensed abnormal condition. In some cases, responsive to abnormal gap condition, relays are operated which interrupt the drive pulses and thus immediately drop the amperage to the electrodes. This will normally place the circuit into and out of operation each time the amperage exceeds the predetermined level. One patent disclosing this type of cutoff system is shown and described in Bell, et al, U.S. Pat. No. 4,134,000, issued on Jan. 9, 1979, for "Protection Circuit for Electrical Discharge Machining Power Supply Apparatus".

Other protection systems for EDM are known which have a cutoff switch that operates responsive to gap short circuit condition to provide a cutoff or pulse narrowing signal to the multivibrator. In this way, triggering pulses to the output switch and thus machining power pulses to the gap are interrupted when abnormal gap condition arises. One system of this type is shown and described in Kurt H. Sennowitz, U.S. Pat. No. 3,590,317, issued on June 29, 1971 for "Electrical Discharge Machining Pulse Current Control Apparatus".

The inventive current limiting system according to the present invention may incorporate a variety of known cutoff circuits of the type referred to above in accomplishing that function.

SUMMARY OF THE INVENTION

The prior art, particularly as described above, has not offered a real solution to the problem of small hole EDM cutting at low amperage levels. Prior art systems have not taken into account the very narrow range of amperage over which this cutting can successfully be accomplished. The present system senses gap current, integrates the signal over a long period to provide a stable signal and then compares it to a preset acceptable value. This represents a real advance in small hole EDM cutting.

BRIEF DESCRIPTION OF THE DRAWINGS

The present invention, its operational features, and its advantages and advancements will be understood from the following specification, together with the drawings in which like numerals are used to refer to identical parts where they occur, and wherein.

DETAILED DESCRIPTION OF THE PREFERRED EMBODIMENT

Figures 1, 2:
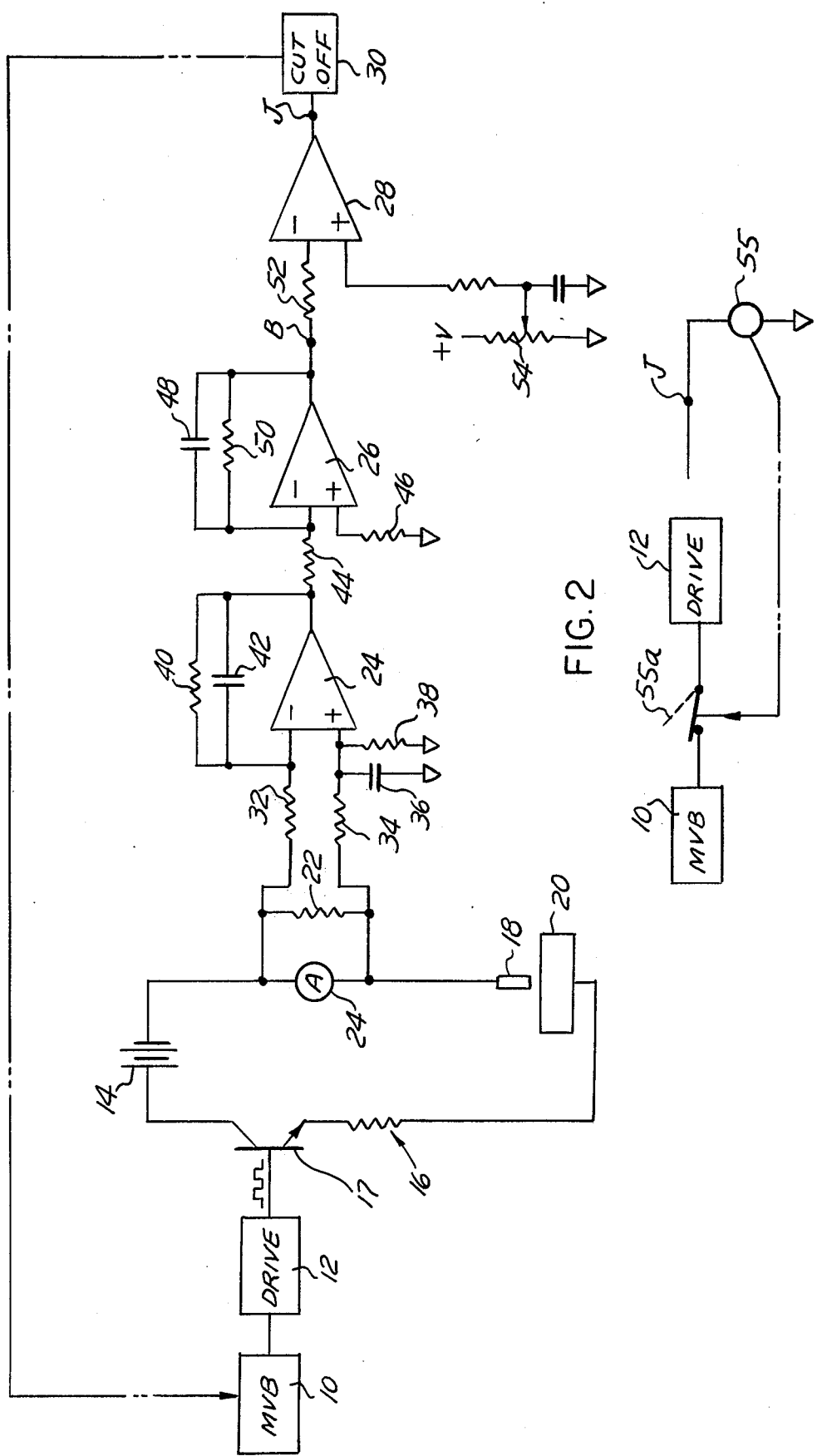
FIG. 1 is a combined schematic and block diagrammatic showing of a basic EDM system and the protection circuit associated with it.
FIG. 2 is a combined schematic and block diagramatic showing of a different type of cutoff system used with the present invention.

FIG. 1 shows the basic parts of an electrical discharge machining power supply which include a multivibrator 10, a drive stage 12, a main machining power source 14 which may be of the order of 70 or 80 volts, and an output module 16 including at least one electronic switch such as transistor 17. It will be understood that the output of the multivibrator 10 may be used to trigger at the same time a number of output modules 16. The multivibrator 10 may be embodied as a free-running multivibrator of the type shown and described in U.S. Pat. No. 3,825,713, issued on July 23, 1974, to Oliver A. Bell, Jr., for "Function Control Circuit for EDM Power Supply" or a digitally controlled pulse generator such as shown in Oliver A. Bell, Jr., U.S. Pat. No. 3,809,848, issued on May 7, 1974, for "Digitally Controlled Power Supply for Electrical Discharge Machining Apparatus". The basic elements of the protection circuit according to our invention are located in the drawing to the right of a machining gap. The gap includes an electrode 18 and a workpiece 20. The signal respresentative of gap current is derived by a shunt resistor 22 used in conjunction with an ammeter 24 which ammeter is connected in the gap circuit. The major parts of the protection circuit include an amplifier and integrator 24, an integrator 26, and a final comparator stage 28. The output at point J is used to control the operation of the cutoff circuit 30. The cutoff circuit 30 exercises a control over the multivibrator 10 and reduces current to the gap through temporary interruption of the operation of the multivibrator. Alternately, it may lengthen the off-time of the machining power pulses as taught in the aforementioned Lobur patent.

Gap current input passes through series resistors 32 and 34 to provide inputs to the minus and plus input terminals of the amplifier and integrator stage 24. A capacitor 36 and a resistor 38 are included in the circuit between the plus terminal and the ground. A further RC external timing network including a resistor 40 and capacitor 42 are connected across the amplifier and integrator stage 24. The voltage output is then passed through a series resistor 44 to the negative input terminal of a following integrator stage 26. The integrator stage 26 has its plus terminal grounded through a resistor 46 and has connected across it an external RC network including a capacitor 48 and a resistor 50. By the time the voltage arrives at point B, it is a relatively stable DC voltage which is proportional to the amperage at the gap. This voltage is provided through a series resistor 52 as an input to the upper negative terminal of a comparator stage 28. The voltage level at the plus input of the comparator 28 is set by the potentiometer 54. In the event the voltage at point B exceeds the potentiometer 54 setting, the voltage at point J will drop to provide a signal the cutoff so that cutoff will occur and current will be limited.

FIG. 2 shows a different type of cutoff which includes a relay coil 55 connected to point J. When point J goes to ground, relay 55 will be operated thus opening its normally closed contact 55a, this will reduce gap current and provide the cutoff operation until gap current returns to an acceptable level.

It will thus be seen that in accordance with excursions of gap current, the voltage at point J will fluctuate and the actual cutoff as provided by cutoff means 30 will be intermittent.

If we put a voltage setting, for example of one volt on the potentiometer 54 having correspondence to 10 amperes and every time the input to the integrator 24 exceeds 10 amperes, the comparator 28 will cause point J to go to ground and the cutoff condition will operate. Immediately the gap current will be limited.

It will thus be seen that the protective circuit is one in which gap amperage is being sampled over a long-term average. The circuit also allows adjustment of average current through movement of the movable contact of the potentiometer 54 when this is required. For example, if a cone-shaped electrode is being used, the starting current could be limited with this circuit until the cut became stable and the amperage area was capable of supporting a greater current. At this point, it would be possible to increase the allowable current by adjustment of the potentiometer 54.

As previously stated, the average current limiting function is specially designed to make it possible to cut with small electrodes which do not give a reliable gap voltage indication once the electrode becomes excessively heated.

It will thus be seen that we have provided a current limiting protection system for EDM which is particularly useful and effective in small hole cutting or in cutting where it is desirable to change the current limit in accordance with an irregularly shaped electrode.

We claim:

1. In a protection system for an electrical discharge machining power supply apparatus for machining a workplace by a relatively small tool electrode across a gap including a multivibrator, means for sensing gap current over a narrow range of acceptable values; an ammeter connected in the gap circuit; means for deriving a voltage signal representative of the gap current sensed comprising a resistor connected across said ammeter; an amplifier stage for amplifying said voltage signal; at least one integrator stage for integrating said amplified voltage signal; and a comparator stage; said comparator stage having one input from said integrator and the other input from a reference voltage; and a cutoff means connected to the output of said comparator and operable to reduce gap current responsive to the voltage signal being greater than the reference voltage signal.

2. The combination as set forth in claim 1, wherein said reference voltage source comprises a DC source and a potentiometer operably connected to said source.

3. The combination as set forth in claim 1, wherein said cutoff means is operably connected to the multivibrator for interrupting its output and thus reducing gap current.

4. The combination as set forth in claim 1, wherein said cutoff means includes a relay coil connected to the output of said comparator, said relay coil operatively connected to 5. The combination as set forth in claim 1 wherein said integrator stage comprises a plurality of successively connected integrator stages.

6. A protection system for an electrical discharge machining power supply apparatus for machining a workpiece by a relatively small tool electrode across a gap, comprising: an ammeter connected in series with the gap; means for sensing a gap current comprising a resistor connected across said ammeter; means for deriving a voltage signal representative of the gap current sensed; an amplifier and integrator stage for amplifying said voltage signal; a further integrator stage for integrating said amplified voltage signal; a reference voltage source; a comparator stage, said comparator stage having one input from said further integrator and the other input from said voltage reference source; and a cutoff means connected to the output of said comparator and operable to reduce gap current responsive to the voltage signal being greater than said reference voltage.

* * * * *